(No Model.)

W. P. LYON & S. VAIL.
End Board Fastening.

No. 230,794.　　　　　　　　Patented Aug. 3, 1880.

WITNESSES:
Chas. Nida.
C. Sedgwick

INVENTOR:
W. P. Lyon
S. Vail
BY Munn & Co.
ATTORNEYS.

UNITED STATES PATENT OFFICE.

WILLIAM P. LYON AND SAMUEL VAIL, OF PORT CHESTER, NEW YORK.

END-BOARD FASTENING.

SPECIFICATION forming part of Letters Patent No. 230,794, dated August 3, 1880.

Application filed April 23, 1880. (No model.)

*To all whom it may concern:*

Be it known that we, WILLIAM P. LYON and SAMUEL VAIL, of Port Chester, in the county of Westchester and State of New York, have invented a new and useful Improvement in End-Board Fastenings for Wagons and Carts, of which the following is a specification.

Figure 1:
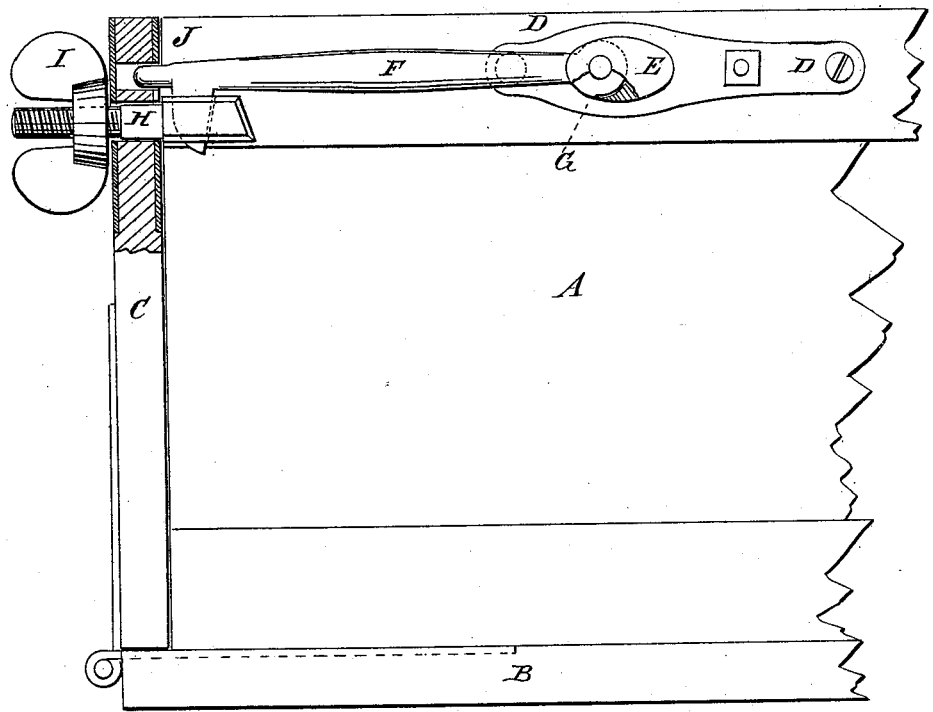
Figure 2:
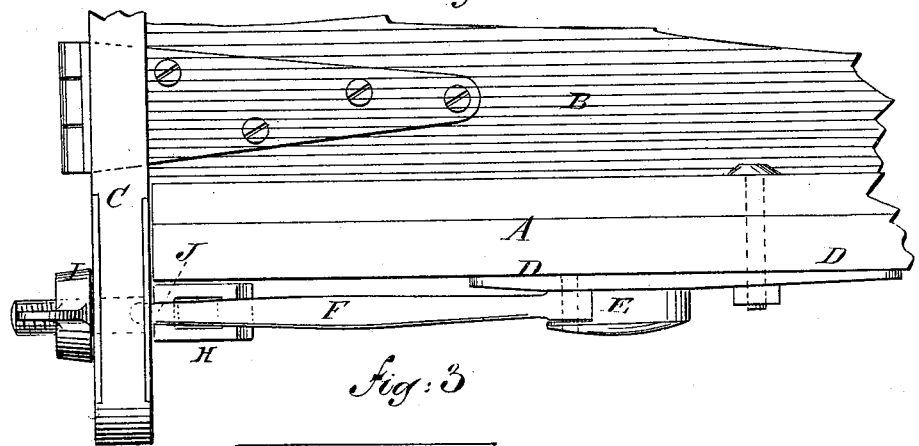
Figure 3:
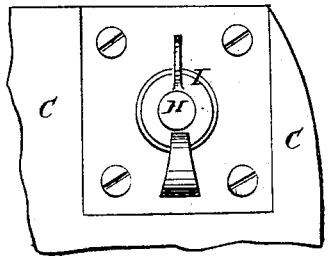

Figure 1 is a side elevation of the improvement, partly in section. Fig. 2 is a plan view. Fig. 3 is a front elevation.

Similar letters of reference indicate corresponding parts.

The object of this invention is to furnish fastenings for the end-boards of wagons and carts so constructed that they will fasten themselves automatically when the end-boards are raised into place, and which, when locked, will hold the end-boards securely, and will not be liable to become accidentally unfastened.

The invention consists in constructing an end-board fastening of a hook having a shoulder and a point, an eyebolt having a square body and a beveled end, and a nut, whereby the end-board of a wagon or cart body can be securely fastened in place, as will be hereinafter fully described.

A represents the side-board, B the bottom board, and C the end-board, of a wagon or cart body, all of which parts are constructed in the usual manner. The end-board C is hinged at its lower edge to the end of the bottom board, B.

To the upper part of the side-board A is attached a plate, D, upon which is formed or to which is attached a socket, E, to receive the end of the shank of the hook F. The end of the shank of the hook F has a shoulder, G, formed upon it to strike against the edge of the socket E, to prevent the hook F from dropping any lower than a horizontal position. The hook F engages with the eye of the eyebolt H, which passes through the end-board C, and has a nut, I, screwed upon its forward end. The forward side of the hook F and the end of the eyebolt H are inclined or rounded, as shown in Fig. 1, so that when the end-board C is raised, bringing the end of the eyebolt H against the hook F, the said hook will rise and drop into the eye of the said eyebolt, hooking itself automatically.

Upon the forward side of the hook F is formed a point, J, which, when the eyebolt H has been drawn forward by screwing up the nut I, enters a hole in the end-board C, so that the hook F cannot become unhooked until the nut I has been turned back. The part of the bolt H that passes through the end-board C is made square, so that the said bolt cannot turn. The part of the end-board C through which the bolt H passes, and into which the point J enters, is faced with metal upon both sides to prevent wear.

One wing of the hand-nut I is made heavier than the other, so that should it be left loose it cannot be unscrewed by the jarring of the wagon.

If desired, a crank-nut may be used, in which case the weight of the crank will prevent the nut from working off.

With this construction, by turning back the nut I and pulling the upper edge of the end-board C outward the hook F will be unhooked, and by raising the end-board C the hook F will be hooked automatically into the eye of the eyebolt H, and by screwing up the nut I the point J will be drawn into the hole in the end-board C, and the fastening will be locked.

Having thus described our invention, we claim as new and desire to secure by Letters Patent—

1. In an end-board fastening, the hook F, having its forward sides beveled and provided with the shoulder G and the projecting point J, in combination with the socket E, the eyebolt H, and the end-board C, provided with a hole to receive the said projecting point, substantially as shown and described.

2. An end-board fastening constructed substantially as herein shown and described, consisting of the hook F, having point J, the eyebolt H, having inclined end, and the nut I, to adapt the fastening to be applied to the side and end boards of a wagon or cart body, as set forth.

3. In an end-board fastening, the combination, with the side-board A and the end-board C, of the plate and socket D E, the hook F, having shoulder G and point J, the eyebolt H, having square body and inclined end, and the nut I, substantially as herein shown and described, whereby the end-board will be securely fastened in place, as set forth.

WILLIAM P. LYON.
SAMUEL VAIL.

Witnesses:
 JAMES McCULLOUGH,
 H. M. HENDERSON.